United States Patent [19] [11] 3,922,249
Mills [45] Nov. 25, 1975

[54] STABILIZED ANTISTATIC COMPOSITIONS USEFUL WITH OLEFIN POLYMERS

[75] Inventor: Kenneth R. Mills, Bartlesville, Okla.

[73] Assignee: Phillips Petroleum Company, Bartlesville, Okla.

[22] Filed: Apr. 12, 1973

[21] Appl. No.: 350,531

[52] U.S. Cl.... 260/45.8 R; 252/400 A; 260/45.9 R; 260/94.9 GB; 260/584 R; 260/584 B
[51] Int. Cl.². C08K 5/17; C08K 5/52; C09K 15/32
[58] Field of Search............ 260/45.8 R, 94.9 GB, 260/DIG. 19, 584 R, 584 B; 252/400 A

[56] References Cited
UNITED STATES PATENTS

| 3,039,993 | 6/1962 | Friedman | 260/45.8 |
| 3,359,234 | 12/1967 | Milionis et al. | 260/45.75 |
| 3,365,435 | 1/1968 | Adams et al. | 260/93.7 |
| 3,485,786 | 12/1969 | Rombusch et al. | 260/80.78 |
| 3,546,161 | 12/1970 | Wolheim | 260/45.85 |
| 3,573,251 | 3/1971 | Megna et al. | 260/45.8 |
| 3,575,903 | 4/1971 | Rombusch et al. | 260/23 |
| 3,631,162 | 12/1971 | McGaugh et al. | 260/94.9 GB |
| 3,701,765 | 10/1972 | Magosch et al. | 260/93.7 |
| 3,732,196 | 5/1973 | Dieterich et al. | 260/93.7 |
| 3,839,506 | 10/1974 | Hechenbleikner et al. | 260/400 A |

Primary Examiner—Ronald W. Griffin

[57] ABSTRACT

Antistatic agents are stabilized against discoloration by admixture with pentaerythritol derivative phosphite esters. The resulting composition alone or admixed with thermal stabilizers is admixed with olefin polymers to prevent yellowing of the antistatic, heat stabilized olefin polymer composition.

11 Claims, No Drawings

STABILIZED ANTISTATIC COMPOSITIONS USEFUL WITH OLEFIN POLYMERS

BACKGROUND OF THE INVENTION

This invention relates to the stabilization of olefin polymers. In one of its aspects, this invention relates to stabilization of antistatic compounds against discoloration. In another of its aspects, this invention relates to the prevention of discoloration of olefin polymers to which antistatic compounds have been added. In one of its concepts, this invention relates to the stabilization of olefin polymers against discoloration by the addition of a premixed stabilizing composition which is itself stabilized against discoloration of its components.

Olefin polymers generally require the addition of a thermal stabilizer to prevent degradation of the polymer during processing. It has also become a practice to add antistatic components to olefin polymers to prevent the build-up of static charge in the polymer during processing and in the finished product. A problem often develops in combining antistatic compounds with thermal stabilizers in that upon aging the mixtures tend to darken or yellow. This effect is noticeable not only in a mixture of the antistatic agent and thermal stabilizer alone but also carries over to cause discoloration of an olefin polymer composition containing combinations of antistatic agent and thermal stabilizer. I have found that a third component can be admixed with thermal stabilizing and antistatic components to form a composition stabilized against discoloration that can be added to olefin polymers as an effective stabilized, antistatic package.

It is therefore an object of this invention to prepare olefin polymer compositions that are stabilized against discoloration, are thermally stabilized, and are antistatic.

Another object of the invention is to prepare antistatic additive compositions that are stabilized against discoloration.

These and other objects of this invention will become apparent to one skilled in the art from studying the following detailed description and the appended claims.

SUMMARY OF THE INVENTION

According to the present invention, there is provided a composition of matter that is useful as an antistatic agent in olefin polymers and that is stabilized against discoloration. This composition comprises an antistatic agent and an amount of a pentaerythritol derivative phosphite compound effective to stabilize the antistatic compound against discoloration.

In one of the embodiments of this invention, an antistatic agent and a thermal stabilizer for olefin polymers are admixed with a pentaerythritol derivative phosphite compound in an amount effective to stabilize the admixture against discoloration.

In another embodiment of the invention, the admixture of antistatic agent, thermal stabilizer, and coloration stabilizing amount of pentaerythritol derivative phosphite are used as a composition effective to stabilize an olefin polymer against discoloration while providing thermal stabilization and antistatic properties.

The stabilized compounds of this invention are generally useful with antistatic agents that are known to produce discoloration upon aging in olefin polymers. Some of the well known antistatic agents used in olefin polymer compositions with which stabilization against discoloration is useful include tertiary amines represented generically as

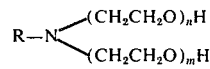

wherein $n$ is an integer of at least one, $m$ is an integer of at least one, $n + m$ ranges from 2 to 50 and R is an alkyl group containing from 7 to 20 carbon atoms. Examples of suitable alkyl groups include heptyl, octyl, dodecyl, tetradecyl, hexadecyl, octadecyl, eicosyl, oleyl, elaidyl, linoleyl, linolelaidyl and the like and mixtures thereof. Examples include:
N,N-bis(2-hydroxyethyl)-N-octylamine
N,N-bis(2-hydroxyethyl)-N-octadecylamine
N,N-bis[poly(oxyethylene)]-N-dodecylamine and the like and mixtures thereof.

These compounds are commercially available and sold by Armour Industrial Chemical Co., Chicago. Their antistatic compound identified as Armostat 310 is derived from tallow.

A second group of antistatic agents are the monoglycerides and diglycerides obtained from the glycerolysis of natural fats or oils such as beef tallow, butter fat, coconut oil, corn oil, olive oil, soy bean oil and the like and from their partial or fully hydrogenated derivatives and mixtures thereof. (An example is Atmul 84 a material sold by Atlas Chemical Industries, Inc. of Wilmington, Del.).

A third group of antistatic agents are the organic phosphate esters and derivatives thereof including the salts and free acids. These are anionic surface-active agents. They include the alkyl phosphates and polyphosphates such as di(2-ethylhexyl)phosphate, (2-ethylhexyl)$_5$Na$_5$(P$_3$O$_{10}$)$_2$, etc., and the partial phosphate esters of nonionics obtained by the phosphorylation of ethyoxylated alcohols, ethoxylated alkylphenols and polyoxypropylene-polyoxyethylene copolymers. (Examples are the materials sold as Gafstat AD-510 and AS-710 by GAF Corp., New York.)

The compounds shown useful by this invention as stabilizers against discoloration are pentaerythritol derivative phosphite compounds such as those described by the generic formula:

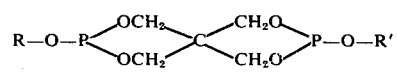

wherein R and R' are the same or different selected from the group consisting of alkyl, cycloalkyl, aryl, alkoxyalkyl, the halo-substituted derivatives thereof containing from one to 20 carbon atoms and combinations thereof such as aralkyl, alkaryl and the like. Examples include:
3,9-di(octadecyloxy)-2,4,8,10-tetraoxa-3,9-diphosphaspiro [5,5] undecane (distearyl pentaerythritol disphosphite)
3,9-di(phenoxy)-2,4,8,10-tetraoxa-3,9-diphosphaspiro [5,5] undecane (diphenyl pentaerythritol diphosphite)
3,9-di(methoxy)-2,4,8,10-tetraoxa-3,9-diphosphaspiro [5,5] undecane
3,9-di(cyclohexyloxy)-2,4,8,10-tetraoxa-3,9-diphosphaspiro [5,5] undecane
3-phenoxy-9-isodecyloxy-2,4,8,10-tetraoxa-3,9-diphosphaspiro [5,5] undecane 3,9-di(o-chlorophenoxy)-2,4,8,10-tetraoxa-3,9-diphosphaspiro [5,5] undecane 3-methoxyethyl-9-isodecyloxy-2,4,8,10-tetraoxa-3,9-diphosphaspiro [5,5] undecane and the like. They are disclosed in Friedman et al U.S. Pat. No. 3,047,608.

Another group of suitable pentaerythritol derivative phosphite compounds are made by reacting a dihydric alcohol or dihydric phenol with diphenyl pentaerythritol phosphite in the presence of an organic phosphite catalyst as disclosed in Friedman et al U.S. Pat. No. 3,053,878. The phosphites are polymeric in nature and contain the recurrent structural unit

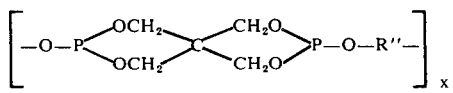

wherein R'' is the alkylene residue of a dihydric alcohol, the arylene residue of a dihydric phenol and the halo-substituted derivatives thereof and $x$ is an integer of at least 2.

Examples of suitable dihydric alcohols and dihydric phenols include:

4,4'-isopropylidenedicyclohexanol
di-(4-hydroxyphenyl)-dimethyl methane (bisphenol A)
diethylene glycol
resorcinol
tetrabromobisphenol A
and the like.

Hindered phenols that can be used as thermal stabilizers in the compositions are known to the art. Typical of such stabilizers are 2,6-di-t-butyl-4-methylphenol (BHT), octadecyl[3-(3,5-di-t-butyl-4-hydroxyphenyl)] propionate (Irganox 1076, Geigy Co.), di-n-octadecyl(3,5-di-t-butyl-4-hydroxybenzyl) phosphonate, tetrakis[methylene(3,5-di-t-butyl-4-hydroxyhydrocinnamate)] methane and 1,3,5-trimethyl-2,4,6-tris(3,5-di-t-butyl-4-hydroxybenzyl)benzene. The quantity of the thermal stabilizer that can be added to the compositions ranges broadly from about 0.01 to about 1.0 parts by weight per 100 parts by weight of the polymer (php). A more preferred range is expressed as about 0.02 to about 0.5 php.

The polyolefins referred to are the normally solid homopolymers of copolymers of aliphatic 1-olefins having from 2–10 carbon atoms per molecule. Examples of these polymers are polypropylene, polyethylene, ethylene/1-butene copolymers, ethylene/1-hexene copolymers, propylene/ethylene copolymers and the like and mixtures thereof. Processes for preparing these polymers are well known. Reference is made to U.S. Pat. No. 2,825,721 of Hogan et al and to U.S. Pat. No. 3,502,632 of Stedefeder et al for description of typical catalytic processes for the preparation of these polyolefins.

The following examples which are meant to be illustrative and not exclusive show the effectiveness of the compositions of this invention as stabilizers against discoloration.

The effect of heat on the color of model systems comprising an amine type antistatic agent, a phenolic stabilizer and various organic phosphites are shown below.

EXAMPLE I

Approximately 5 grams of each component of the combinations of components to be tested were thoroughly mixed. After mixing, the mixed material was placed in a 2 ounce vial with the top of the vial loosely covered. The vials were held at 120°C for 18 hours and then the color of the material in the vial was noted. The results are shown in Table I below.

TABLE I

| Run No. | 1 | 2 | 3 | 4 | 5 | 6 | 7 |
|---|---|---|---|---|---|---|---|
| Antistatic agent[1], gms | 10 | 5 | 5 | 5 | 5 | 5 | 5 |
| Phenolic stabilizer[2], gms |  | 5 | 5 |  | 5 | 5 |  |
| Phosphite[3], gms |  |  | 5 | 5 |  |  |  |
| Phosphite[4], gms |  |  |  |  | 5 |  |  |
| Phosphite[5], gms |  |  |  |  |  | 5 | 5 |
| Color after 18 hrs at 120°C | very lt. yellow | brown | white, clear | white, clear | lt. yellow | yellow | yellow |

[1]Armostat 310
[2]2,6-di-t-butyl-4-methylphenol
[3]distearyl pentaerythritol disphosphite (Weston 618)
[4]dioctyl phosphite
[5]tris nonylphenyl phosphite The results show that distearyl pentaerythritol diphosphite is effective in preventing discoloration of the tertiary amine antistatic agent either alone or admixed with a phenolic stabilizer used in stabilizing polyolefins. Two other phosphite stabilizers commonly used in polymer compositions were ineffective.

EXAMPLE II

An acetone slurry of a phenolic stabilizer was mixed with an antioxidant free ethylene/1-butene copolymer characterized by a density of about 0.95 g/cc and a melt index of about 1.2 as determined by ASTM D1238-62T condition E. The solvent was evaporated to give a mixture containing about 0.1 parts by weight stabilizer per 100 parts by weight polymer (php).

The stabilized polymer for each run was charged to the mixing chamber of a Brabender Plastograph and mixed under a nitrogen atmosphere at 185°C at 50 RPM until fluxed. The other additive or additives were then charged and the mixing continued an additional 10 minutes at the conditions stated above.

TABLE II

| Run No. | Phenolic Stabilizer[1] (php) | Antistatic Agent[2] (php) | Phosphite[3] (php) | Phosphite[4] (php) |
|---|---|---|---|---|
| 8 | 0.1 | — | — | — |
| 9 | 0.1 | 0.5 | — | — |

TABLE II-continued

| Run No. | Phenolic Stabilizer[1] (php) | Antistatic Agent[2] (php) | Phosphite[3] (php) | Phosphite[4] (php) |
|---|---|---|---|---|
| 10 | 0.1 | 0.5 | 0.1 | — |
| 11 | 0.1 | 0.5 | — | 0.1 |
| 12 | 0.5 | 2.5 | — | — |
| 13 | 0.5 | 2.5 | 0.25 | — |

[1] 2,6-di-t-butyl-4-methylphenol
[2] Armostat 310
[3] distearyl pentaerythritol diphosphite
[4] tris nonylphenyl phosphite Each sample for runs 8–13 was removed from the mixing chamber of the Plastograph and compression molded into discs ¼ inch thick. One disc of each blend was retained as a control and one disc of each blend was aged for three days at 120°C in an air oven. The color of the discs were then determined by means of a Hunter Color Difference Meter, Model No. D 25M. The results follow:

TABLE III

| Run No. | Control Sample Color Value | | | Heat Aged Sample Color Value | | |
|---|---|---|---|---|---|---|
|  | L[1] | a[2] | b[3] | L | a | b |
| 8 | 81.0 | −1.4 | 1.3 | 82.1 | −1.0 | 1.9 |
| 9 | 82.2 | −1.4 | 1.2 | 82.5 | −1.6 | 4.0 |
| 10 | 82.8 | −1.5 | 1.2 | 67.1 | 4.0 | 20.0 |
| 11 | 80.0 | −1.2 | 4.7 | 69.3 | 3.5 | 14.0 |
| 12 | 81.2 | −1.8 | 2.6 | 73.6 | 1.3 | 18.1 |
| 13 | 81.1 | −1.9 | 4.7 | 53.7 | 6.7 | 17.1 |

[1] L is a calibration of "whiteness" with 0 = black and 100 = white.
[2] a is calibrated on a color scale of 0 = absence of tint, − is degree of green, + is degree of red.
[3] b is calibrated on a color scale of 0 = absence of tint, − is degree of blue, + is degree of yellow.

The results show a minor color development in the heat aged stabilized polymer alone and in the blend containing both stabilizer and antistatic agent. Note relatively small changes in the values above, particularly the *b* values. Addition of each phosphite worsened the color development of the heat aged samples. The runs were not made in accordance with the method of the invention since the additives were not mixed prior to adding them to the fluxed polymer.

EXAMPLE IV

In this Example, the additives were mixed together and added to the same polyethylene used in Example II. Each blend was mixed for 10 minutes under a nitrogen atmosphere at 185°C at 50 RPM rotor speed.

TABLE IV

| Run No. | | 14 | 15 | 16 | 17 | 18 | 19 | 20 | 21 |
|---|---|---|---|---|---|---|---|---|---|
| Additive, php | | | | | | | | | |
| phenolic stab.[1] | | 0.1 | 0.1 | 0.1 | 0.1 | 0.5 | 0.5 | 0.5 | — |
| antistatic agent[2] | | — | 0.1 | 0.1 | 0.1 | 0.5 | 0.5 | 0.5 | 0.1 |
| phosphite[3] | | — | — | 0.1 | — | — | 0.5 | — | — |
| phosphite[4] | | — | — | — | 0.1 | — | — | 0.5 | — |
| Hunter Color | | | | | | | | | |
| control | L | 78.7 | 79.5 | 82.0 | 80.4 | 82.3 | 81.8 | 80.8 | 80.5 |
|  | a | −2.3 | −1.6 | −1.2 | −1.3 | −1.2 | −1.1 | −1.3 | −1.4 |
|  | b | 5.1 | 2.8 | 0.1 | 2.4 | 0.5 | 0.1 | 1.5 | 4.3 |
| aged | L | 79.7 | 77.1 | 81.3 | 69.1 | 82.2 | 81.6 | 76.1 | 78.6 |
| samples | a | −2.0 | −4.8 | −1.6 | +2.7 | −1.9 | −1.5 | −0.1 | −1.0 |
|  | b | 4.8 | 17.7 | 4.4 | 13.8 | 4.3 | 3.0 | 8.0 | 8.8 |

[1] 2,6-di-t-butyl-4-methylphenol
[2] Armostat 310
[3] distearyl pentaerythritol diphosphite
[4] tris nonylphenyl phosphite The results show very little color change in the heat aged sample containing only the phenolic stabilizer (run 14) and a significant yellowing of heat aged sample 21 containing only the antistatic agent. Run 15 shows a pronounced yellowing of the heat aged sample containing both phenolic stabilizer and antistatic agent. Run 18 contains a larger amount of both additives and the heat aged sample exhibits a marked color change although less than run 15. Runs 16 and 19 show the addition of the preferred phosphite when premixed with the other additives is effective in preventing a major color change in the heat aged samples. Runs 17 and 20 show that tris nonylphenyl phosphite is not effective in preventing a major color change, note values L and b.

Any finite amount of pentaerythritol derived phosphite compound added to the antistatic agent will have an effect of inhibiting discoloration. For practical reasons, the amount of discoloration inhibitor will usually be in the range from about 0.25 to 1 part per part by weight of phenolic stabilizer.

In the stabilizer system admixture containing a thermal stabilizer, an antistatic agent, and the pentaerythritol derived phosphite compound the concentrations of the additives because of practical considerations of economics will generally fall in ranges as follows:

| Additive | concentration, php | |
|---|---|---|
|  | broad | preferred |
| Thermal stabilizer | 0.01–1 | 0.02–0.05 |
| Antistatic agent | 0.02–2 | 0.05–1.0 |
| Color stabilizer | 0.005–1 | 0.05–0.5 |

While these concentrations, as stated above, are practical ranges, it must be noted that any finite amount of any of the additives above would be an effective amount for the purpose for which it was added.

The various additives are admixed with the polymer using conventional techniques such as dry blending, melt blending on a roll mill or in an extruder, Banbury mill and the like. It is important that the additives be premixed before they are added to the polymer as the results in Example IV show.

Other additives can also be admixed with the polymer composition if desired. These include processing aids, pigments, other antioxidants, UV stabilizers and the like providing they are not antagonistic in behavior to the polymer composition.

Reasonable variation and modification are possible within the scope of the foregoing disclosure and the appended claims the essence of which is that a pentaerythritol derivative phosphite compound can be admixed with an antistatic agent or into a composition containing an antistatic agent and thermal stabilizer and the admixture used to effectively prevent discoloration of an olefin polymer composition containing the admixture.

I claim:

1. An antistatic composition stabilized against discoloration comprising an antistatic agent selected from at least one tertiary amine represented by the formula

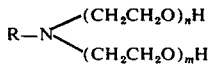

wherein $n$ is an integer of at least one, $m$ is an integer of at least one, and $n + m$ ranges from 2 to 50, R is an alkyl group containing seven to 20 carbon atoms; and admixed therewith a pentaerythritol derivative phosphite compound selected from the group consisting of

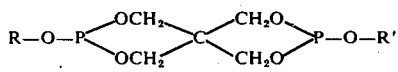

wherein R and R' are the same or different selected from the group consisting of alkyl, cycloalkyl, aryl, alkoxyalkyl, the halo-substituted derivatives thereof containing from one to 20 carbon atoms and mixtures thereof and a polymeric phosphite containing the recurrent structural unit

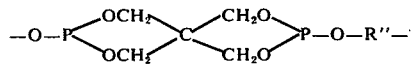

wherein R'' is the alkylene residue of a dihydric alcohol, the arylene residue of a dihydric phenol and the halo-substituted derivatives thereof and $x$ is an integer of at least 2.

2. A composition of claim 1 wherein the antistatic agent is selected from the group consisting of N,N-bis(2-hydroxyethyl)-N-octylamine; N,N-bis(2-hydroxyethyl)-N-octadecylamine; N,N-bis[(poly (oxyethylene)]-N-dodecylamine; and mixtures thereof and the phosphite compound is distearyl pentaerythritol diphosphite.

3. The composition of claim 1 also comprising admixed therewith an effective amount of a hindered phenol thermal stabilizer.

4. The composition of claim 3 wherein the antistatic agent is selected from the group consisting of N,N-bis(2-hydroxyethyl)-N-octylamine; N,N-bis(2-hydroxyethyl)-N-octadecylamine; N,N-bis[(poly (oxyethylene)]-N-dodecylamine; and mixtures thereof and the phosphite compound is distearyl pentaerythritol diphosphite.

5. A stabilized composition comprising an olefin polymer and a composition of matter of claim 3.

6. The composition of claim 5 wherein the olefin polymer is polyethylene, and the ingredients of the stabilized antistatic composition are present in amounts sufficient to stabilize the polymer against discoloration while providing thermal stabilization and antistatic properties.

7. The composition of claim 6 wherein the phosphite compound is present in the amount of 0.005–1 parts per hundred parts of polymer, the antistatic agent is present in the amount of 0.02–2 parts per hundred parts of polymer, and the thermal stabilizer is present in the amount of 0.01–1 parts per hundred parts of polymer.

8. The composition of claim 7 wherein the antistatic agent is selected from the group consisting of N,N-bis(2-hydroxyethyl)-N-octylamine; N,N-bis(2-hydroxyethyl)-N-octadecylamine; N,N-bis[poly(oxyethylene)]-N-dodecylamine; and mixtures thereof and the phosphite compound is distearly pentaerythritol diphosphite.

9. A method for stabilizing olefin polymers said method comprising: (a) preparing a composition of claim 1, and (b) admixing a stabilizing amount of said composition with an olefin polymer.

10. A method for stabilizing olefin polymers said method comprising: (a) preparing a composition of claim 3, and (b) admixing a stabilizing amount of said composition with an olefin polymer.

11. A method of claim 10 for stabilizing olefin polymers wherein the antistatic agent is selected from the group consisting of N, N-bis (2-hydroxyethyl)-N-octylamine; N,N-bis(2-hydroxyethyl)-N-octodecylamine; N,N-bis[(poly (oxyethylene)]-N-dodecylamine; and mixtures thereof and the phosphite compound is distearyl pentaerythritol diphosphite.

* * * * *

UNITED STATES PATENT AND TRADEMARK OFFICE
CERTIFICATE OF CORRECTION

PATENT NO. : 3,922,249
DATED : November 25, 1975
INVENTOR(S) : Kenneth R. Mills

It is certified that error appears in the above-identified patent and that said Letters Patent are hereby corrected as shown below:

The formula in claim 1, column 7, line 50 should be as follows:

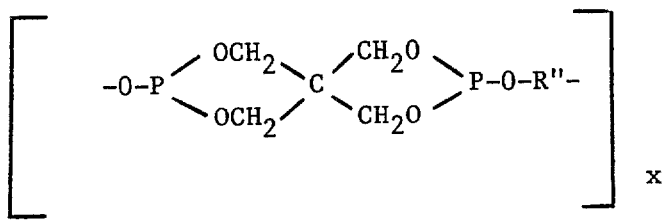

Signed and Sealed this ninth Day of March 1976

[SEAL]

Attest:

RUTH C. MASON
Attesting Officer

C. MARSHALL DANN
Commissioner of Patents and Trademarks